(12) United States Patent
Tilaye et al.

(10) Patent No.: US 9,746,632 B1
(45) Date of Patent: Aug. 29, 2017

(54) LIGHT WAVEGUIDE APPARATUS

(71) Applicant: EchoStar Technologies L.L.C., Englewood, CO (US)

(72) Inventors: Swapnil Anil Tilaye, Superior, CO (US); Nicholas Brandon Newell, Centennial, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 15/268,677

(22) Filed: Sep. 19, 2016

(51) Int. Cl.
  G02B 6/44 (2006.01)
  H04B 10/116 (2013.01)
  G02B 6/26 (2006.01)
  G02B 6/32 (2006.01)

(52) U.S. Cl.
  CPC ........... *G02B 6/4466* (2013.01); *G02B 6/262* (2013.01); *G02B 6/32* (2013.01); *H04B 10/116* (2013.01)

(58) Field of Classification Search
  CPC ........ G02B 6/4466; G02B 6/262; G02B 6/32; H04B 10/116
  See application file for complete search history.

(56) References Cited

U.S. PATENT DOCUMENTS

| | | | |
|---|---|---|---|
| 4,665,430 A | 5/1987 | Hiroyasu | |
| 5,309,541 A | 5/1994 | Flint | |
| 5,469,236 A | 11/1995 | Roessel | |
| 5,581,447 A * | 12/1996 | Raasakka | F21S 11/00 126/698 |
| 5,729,394 A | 3/1998 | Sevier et al. | |
| 5,835,458 A | 11/1998 | Bischel et al. | |
| 7,021,777 B2 | 4/2006 | Amitai | |
| 7,042,631 B2 * | 5/2006 | Smith | G02B 6/032 359/333 |
| 7,526,153 B2 | 4/2009 | Uchida | |
| 7,655,934 B2 | 2/2010 | Gorrell et al. | |
| 9,203,342 B2 | 12/2015 | Rongve et al. | |
| 2002/0171896 A1 | 11/2002 | Clark et al. | |
| 2004/0004780 A1 | 1/2004 | Watanabe | |
| 2005/0201707 A1 | 9/2005 | Glebov et al. | |
| 2008/0044143 A1 | 2/2008 | Wang et al. | |
| 2009/0148931 A1 * | 6/2009 | Wilkerson | C12M 21/02 435/286.1 |
| 2011/0013868 A1 | 1/2011 | Suzumura et al. | |
| 2013/0182620 A1 | 7/2013 | Chaffee et al. | |

* cited by examiner

Primary Examiner — Ryan Lepisto
(74) Attorney, Agent, or Firm — Bejin Bieneman PLC

(57) ABSTRACT

A light waveguide apparatus includes a light transmission body that is fittable under or around a structure such as a window or a door. The light waveguide apparatus includes two lenses, each mounted to a respective end of the light transmission body. The apparatus further includes a transmission medium optically coupling the lenses.

21 Claims, 6 Drawing Sheets

LIGHT WAVEGUIDE APPARATUS

BACKGROUND

Growing demand for media content means there is a growing need for bandwidth not just to, but within, a customer premises. For example, for playback of high resolution video on wireless devices, needed bandwidth, e.g., via existing radio-based technologies such as LTE (long term evolution) wireless communications, and Wi-Fi communications, i.e., according to IEEE 802.11, is often not available. Another technology for supporting high bandwidth media transmissions is Li-Fi, i.e., Light Fidelity, communications. Using the visible light spectrum, Li-Fi technology can transmit data thousands of times faster than existing radio spectrum based technologies. However, Li-Fi requires that a receiving Li-Fi device receives light beams transmitted by a Li-Fi transmitter, i.e., photo detectors of a Li-Fi receiver have to be able to actually "see" the transmitted light in order to capture the data.

DETAILED DESCRIPTION

Introduction

A light waveguide apparatus can guide light beams originated from a Li-Fi transmitter to a Li-Fi receiver which is not in a line-of-sight of a Li-Fi transmitter and cannot practically otherwise receive, i.e., by reflection, light beams transmitted by the Li-Fi transmitter, e.g., when an interior door blocks a penetration of light between the Li-Fi transmitter and the Li-Fi receiver. In other words, the light waveguide apparatus may substitute for at least a portion of a line-of-sight between the Li-Fi transmitter and the Li-Fi receiver, referred to herein as a "virtual line of sight." Even though the virtual line-of-sight provided by the light waveguide apparatus may not be a straight line, light beams can be guided from the Li-Fi transmitter to the Li-Fi receiver to provide data communication between the Li-Fi transmitter and the Li-Fi receiver.

System Elements

Figure 1:
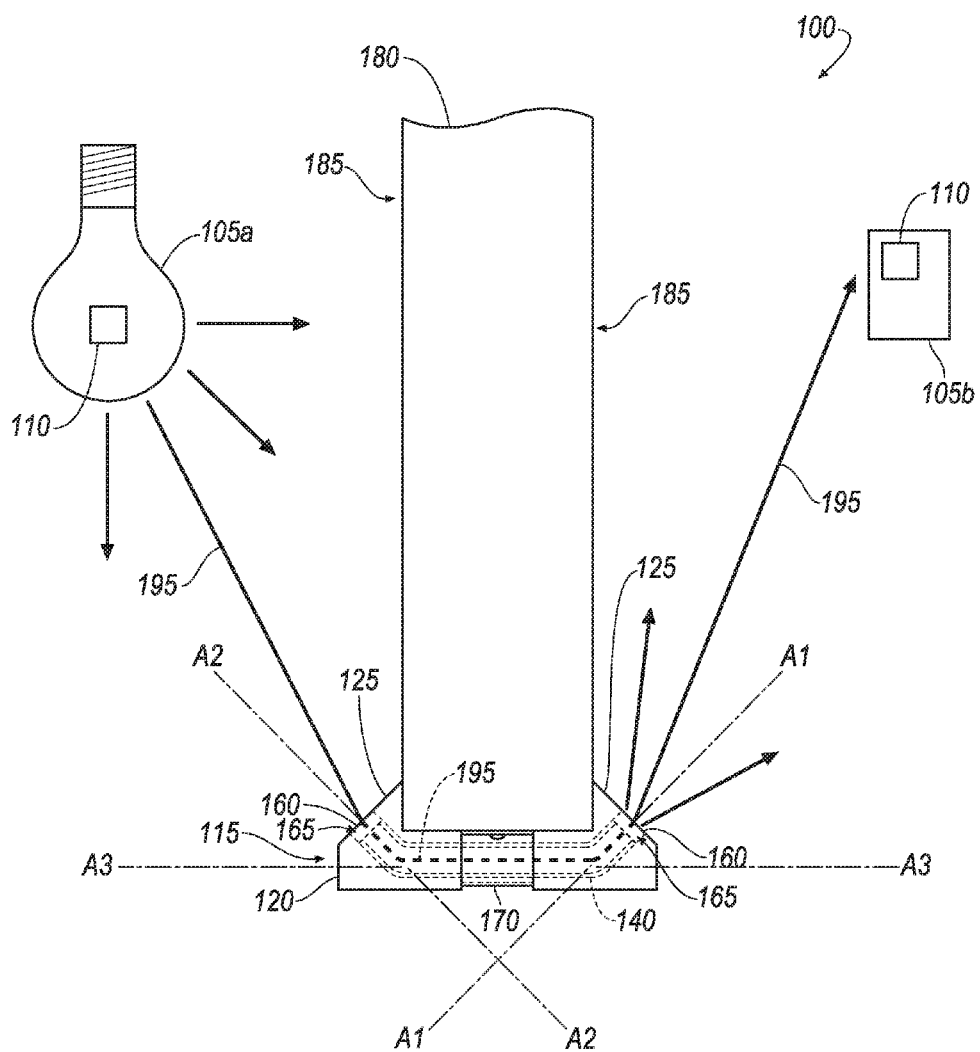
FIG. 1 is a perspective view of an exemplary system including an exemplary light waveguide apparatus.

FIG. 1 illustrates an example system 100 including Li-Fi devices 105 communicating via Li-Fi through a light waveguide apparatus 115. The light waveguide apparatus 115 includes a light transmission body 120 that is fittable under or around a structure such as a window or a door 180. The light waveguide apparatus 115 includes two lenses 160, each mounted to a respective end 125 of the light transmission body 120. The apparatus 115 further includes a transmission medium 140 optically coupling the lenses 160.

Light Fidelity (Li-Fi) is a bidirectional, high-speed and fully networked visible light communication technology similar to Wi-Fi, and, like Wi-Fi, uses specifications from the well-known IEEE 802.11 family of standards. However, Li-Fi uses visible light instead of radio frequency waves, which has a wider bandwidth. For example, Li-Fi data rates over 10 Gbit/s have been measured. Li-Fi devices 105 may include mobile devices, personal computers, tablet computers, internet routers, etc. which include a Li-Fi communication interface 110 such as Light Emitting Diodes (LEDs) as are known. For example, as shown in FIG. 1, a light bulb may include a Li-Fi communication interface 110 to provide internet router functionality in a customer premises, thereby constituting a Li-Fi device 105a. Another Li-Fi device 105b in an area separated by the door 180, e.g., in another room, may communicate with the internet router Li-Fi device 105a via the apparatus 115.

As is known, a Li-Fi communication interface 110 of a Li-Fi device 105 may transmit and/or receive data to and/or from other Li-Fi devices 105 via one or more light beams. In one example, data is included in a transmitted light beam by light intensity fluctuations, e.g., by turning the light beam on and off according to a pattern that encodes the data. Therefore, fluctuations of the light beam intensity are not discernable by human eyes.

A Li-Fi communication interface 110 may include one or more light transceivers to emit and/or receive one or more light beams. A light transceiver of a Li-Fi device 105 may include a light emitter that transmits one or more light beams, including data, that may be received by one or more other Li-Fi devices 105. A Li-Fi device 105 light transceiver may further include one or more light sensors to receive light beams including data from other Li-Fi devices 105.

Wavelengths of light beams used in Li-Fi communication may be in a visible light spectrum, i.e., visible to human eyes, or in an invisible light spectrum, i.e., invisible to human eyes. In one example, a Li-Fi device 105 may transmit light beams in both visible and invisible wavelengths, e.g., an internet router light bulb may produce visible light to illuminate an area and invisible light to transmit data.

When the line-of-sight between Li-Fi devices 105 is obstructed, e.g., by the interior door 180 as shown in FIG. 1, the apparatus 115 can provide a virtual line-of-sight 195 for Li-Fi communication between the Li-Fi devices 105. The apparatus 115 guides the light beams via the transmission medium 140. To transmit the light beams, the transmission medium 140 may be formed of a fiber optic material. The light beam may be transmitted via the fiber optic material. Alternatively, the transmission medium 140 may be a hollow tube with an interior surface covered with a reflective material such as silver. Thus, the light beam may be transmitted via the successive reflections along the interior surface.

Respective axes A1, A2 of at least one of the lenses 160 may each form respective acute angles with a longitudinal axis A3 of the body 120. The longitudinal axis A3 typically extends a shortest distance between the body 120 ends 125.

Figure 2A:
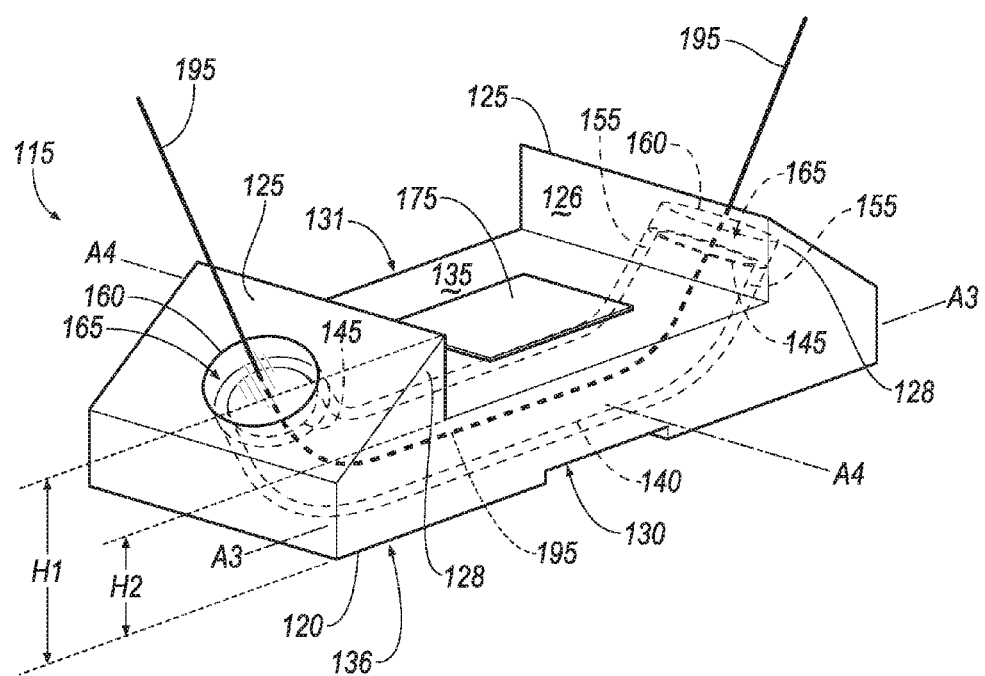
FIG. 2A is a detailed perspective view of the light waveguide apparatus of FIG. 1.

FIG. 2A illustrates a perspective view of an example apparatus 115. The apparatus 115 body 120 in the illustrated example has a substantially solid trapezoidal shape with a top cutout 131 and a bottom cutout 130. Additionally, the body 120 trapezoidal shape may have notch(es) at the body 120 ends 125. The top and/or bottom cutouts 131, 136 may extend along a lateral axis A4 transverse to the longitudinal axis A3. The body 120 may have a top surface 135 and a bottom surface 136 extending between the body 120 ends 125. A distance of the body 120 bottom surface 136 to a topmost edge or surface of the body 120 trapezoidal solid is defined herein as a height H1. A distance of the body 120 bottom surface 136 to the top surface 135 of the cutout 131 of the body 120 is defined herein as a height H2. The height H2, e.g., 1 cm, is less than the height H1, e.g., 2 cm. Alternatively, the apparatus 115 body 120 may have other shapes such as a solid rectangle, etc.

To mount the apparatus 115 to the door 180, an adhesive pad 175 may be affixed to the top surface 135. The adhesive pad 175 may be attachable to the door 180 bottom surface 190, e.g., the adhesive pad 175 may adhere to the door 180 bottom surface 190.

Alternatively or additionally, to mount the apparatus 115 under the door 180, the body 120 may be frictionally engageable with the door 180. For example, the body 120 may be formed of an elastic material such as rubber and side surfaces 126 of the body 120 cutout 131 may frictionally secure the apparatus to the door 180, e.g., by clamping and/or frictional engagement of upwardly extending engagement portions 128 at the body 120 ends 125 to the door 180 side surfaces 185. The portions 128, as can be seen, extend upwardly away from the body 120 bottom surface 136. Additionally, the portions 128 may include the side surfaces 126 facing one another. The side surfaces 126 may frictionally engage with the door 180 and/or form a clamp to hold the apparatus 115 body 120 to the door 180.

Figure 2B:
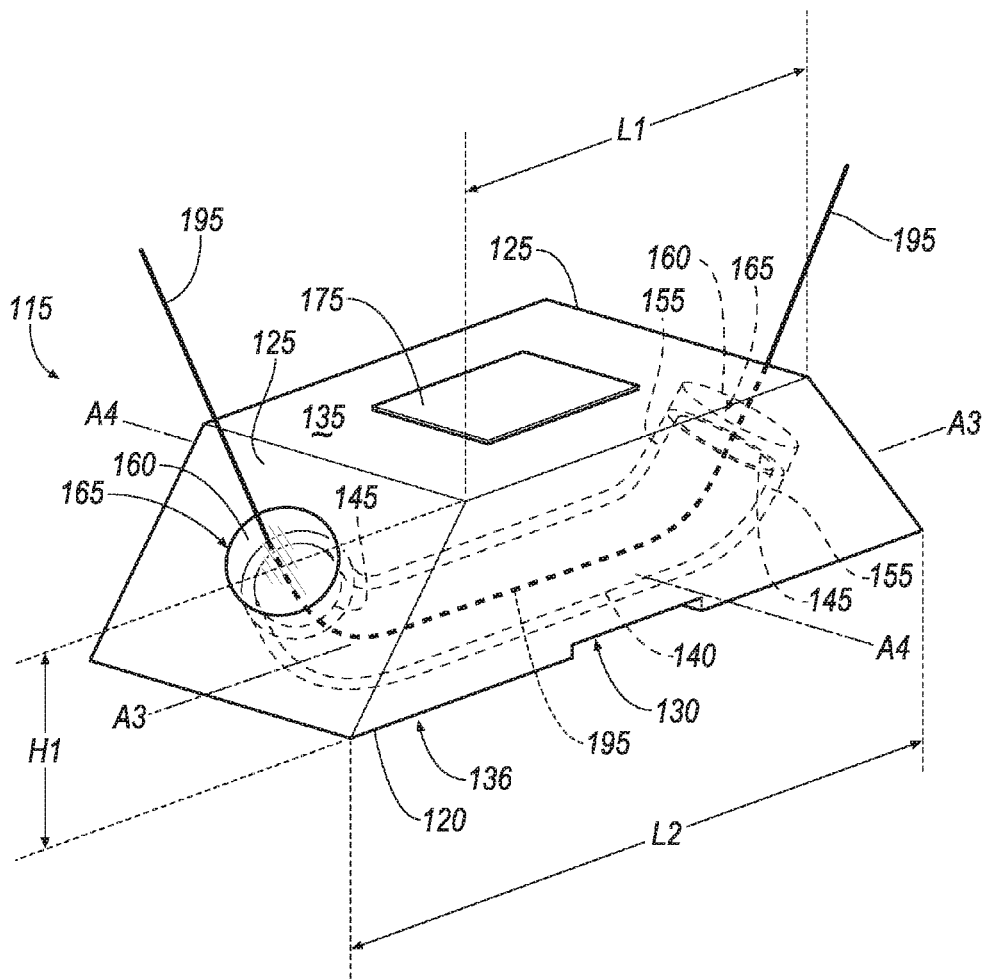
FIG. 2B is a perspective view of another example light waveguide apparatus.

FIG. 2B illustrates another example of an apparatus 115' in which like elements have like numbers, and to which the above explanation applies. Variations in elements discussed above are designated with a "prime" symbol, e.g., the apparatus 115'. The apparatus 115' differs from the apparatus 115 in certain respects. For example, the apparatus 115' body 120 may have a trapezoidal shape without top cutout. The apparatus 115' may attach to the door 180 bottom surface 190 via the adhesive pad 175 (see FIG. 2) and/or the bracket 170 (see FIG. 3). As with the apparatus 115, the apparatus 115' features a portion fittable under a door such as the door 180, this portion having a length L1 that is equal to a length of a top portion of the trapezoidal shape of the body 120. Further, the apparatus 115' has lenses 160 disposed in angled sides having a first edge at an end of the length L1 and a second edge at an end of a length L2; the length L2 is defined by a length of a bottom portion of the trapezoidal shape. The apparatus 115' lacks the upwardly extending engagement portions of the apparatus 115 shown in FIG. 2A.

Figure 3:
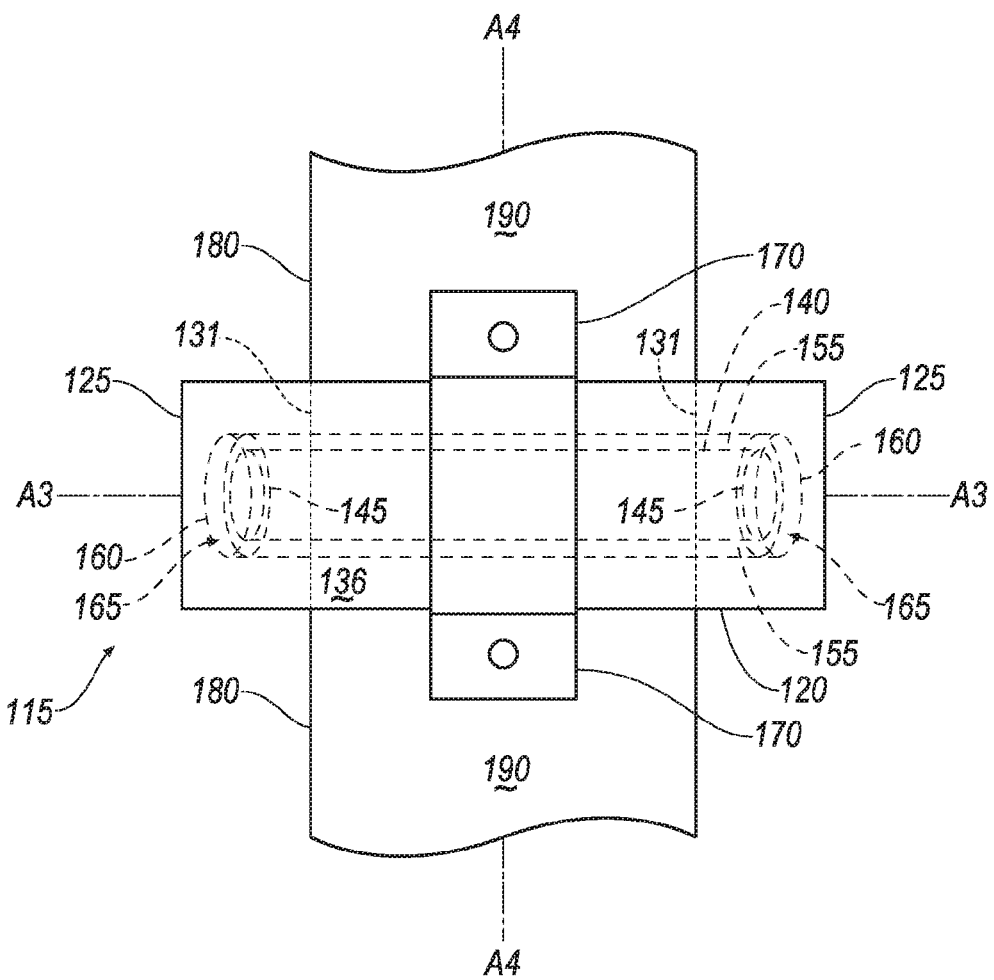
FIG. 3 is a bottom view of the light waveguide apparatus of FIG. 1 mounted at a bottom of a door.

Yet further alternatively or additionally, as shown in FIG. 3, the apparatus 115 can be mounted to the door 180, e.g., via a bracket 170 that is mountable to the door 180 bottom surface 190. When the apparatus 115 is mounted to the door 180, the bracket 170 may be engaged with the bottom cutout 130 of the body 120 bottom surface 136. The bracket 170 may be formed of metal, plastic, etc. The bracket may be mounted to the door 180 bottom surface 190, e.g., via screws.

Figure 4:
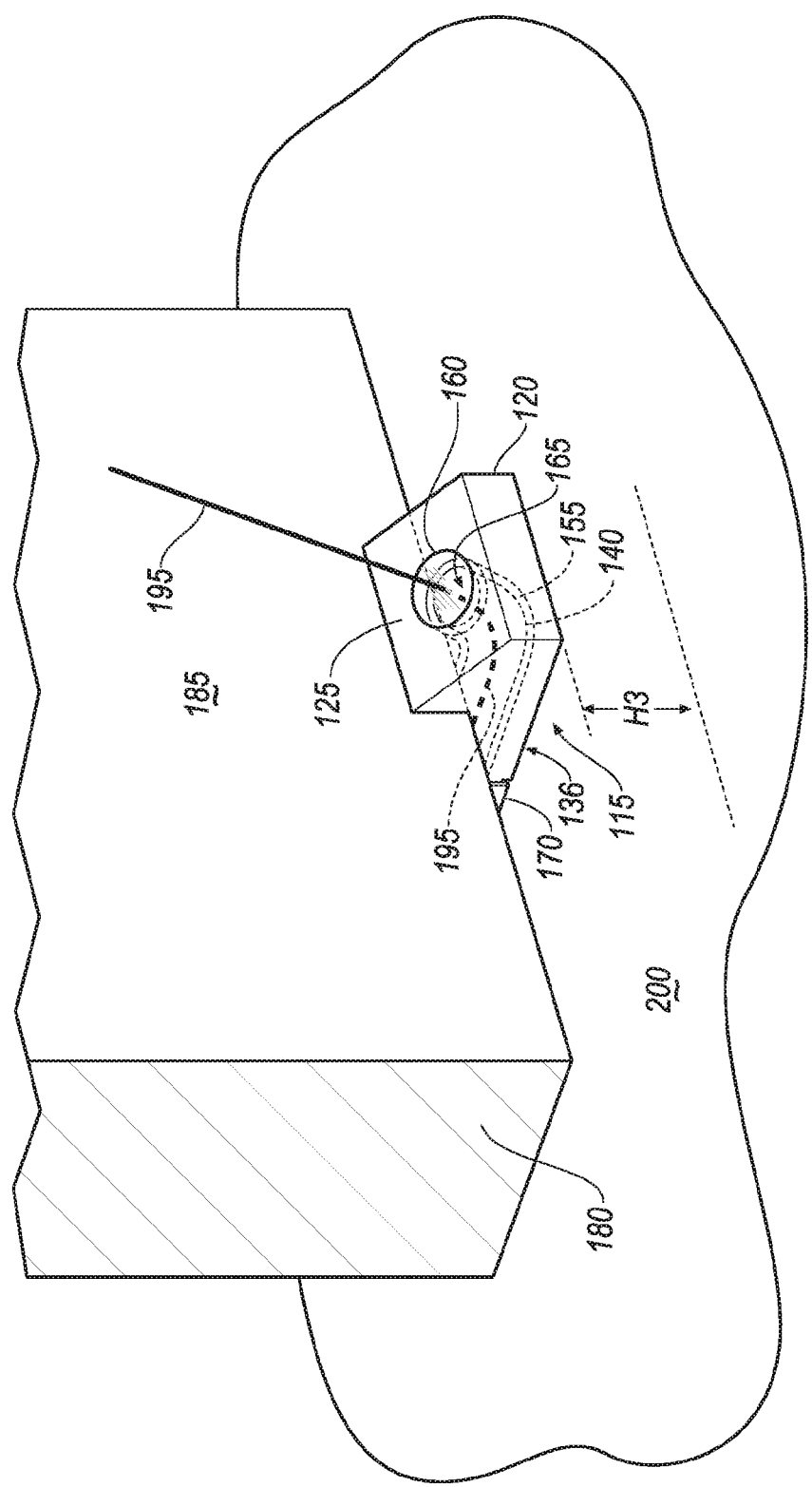
FIG. 4 is perspective view of the light waveguide apparatus of FIG. 1 fitted under a door.

FIG. 4 illustrates a perspective view of the apparatus 115 fitted under a door 180, e.g., an interior door 180, and providing a virtual line-of-sight 195 between two areas separated by the door 180. The apparatus 115 may be mounted to the door 180 in various ways, as discussed above, e.g., via the adhesive pad 175, the bracket 170, or the cutout 131 side surfaces 126 clamping the door 180 side surfaces 185. The apparatus 115 may move with the door 180 while the door 180 is opened and closed, the body 120 bottom surface 136 typically being separated by a gap with a height H3, e.g., one millimeter or more, from a floor surface 200. Alternatively, especially for rugs or carpeted floor surfaces 200, the body 120 may have a smooth bottom surface 136 (see FIG. 3), i.e., having a low friction coefficient, to allow for easy sliding over the floor surface 200.

Figure 5:
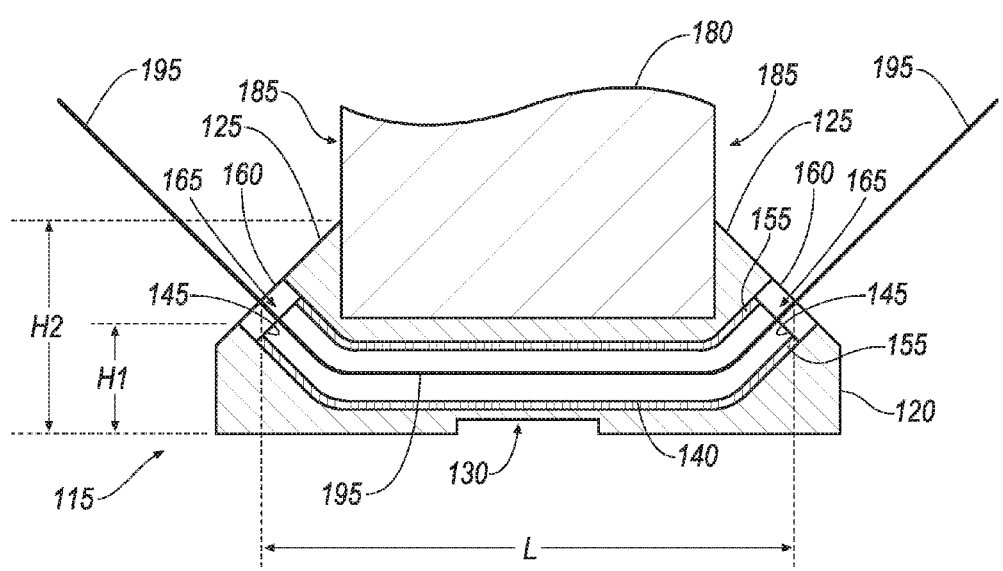
FIG. 5 is a sectional view of the light waveguide apparatus of FIG. 1 fitted under a door.

FIG. 5 illustrates a sectional view of the apparatus 115. The transmission medium 140 guides light beams entered from a transmission medium 140 end 145 to another end 145. As one example, the transmission medium 140 may be approximately 4 cm long and may have a tubular shape with a diameter about 0.5 cm. The apparatus 115 transmission medium 140 may have a length L of about 5 cm to provide a medium underneath and from one side 185 to another side 185 of a typical interior door 180 with a typical thickness of about 4 cm. The transmission medium 140 may have an elongated section with bends at the ends 145, as shown in Figures. Alternatively, the transmission medium 140 may have a curved shape along its length.

As one example, a fiber optic transmission medium 140 may be formed of transparent glass or plastic, e.g., one fiber optic core or multiple fiber optic cores bundled together. The apparatus 115 may include a cladding 155 disposed between the body 120 and the fiber optic transmission medium 140, i.e., surrounding the transmission medium 140. The cladding 155 is one or more layers of materials with a first refractive index in contact with the fiber optic transmission medium 140 with a second refractive index that is greater than the first refractive index. The cladding 155 causes light to be confined to the transmission medium 140 while being transmitted from one of the transmission medium 140 ends 145 to another end 145. The fiber optic material included in the fiber optic transmission medium 140 may guide light beams in visible and/or invisible light wavelengths, i.e., an optical transmission range of the transmission medium 140 may include visible and/or invisible light wavelength ranges. Li-Fi devices 105 may communicate via visible, invisible, or both light spectrums. Therefore, the transmission medium 140 guiding both invisible and visible light provides a virtual line-of-sight 195 for Li-Fi devices 105 independent of the light spectrum utilized by the Li-Fi-devices 105.

As another example, a hollow tube transmission medium 140 guides the light beams between the body 120 ends 125 through successive reflections. To guide the light beams along the hollow tube transmission medium 140, the hollow tube transmission medium 140 interior surface may be coated with reflective materials such as silver to provide successive reflections of light beams. The hollow tube transmission medium 140 may guide invisible and/or visible light.

The lenses 160 attached to the body 120 ends 125 focus the light beams entering the apparatus 115 and disperse the light beams exiting the apparatus 115. For example, one or both of the lenses 160 may be biconvex lenses. The lenses 160 may be mounted to the body 120 ends 125 adjacent to one of the transmission medium 140 ends 145, i.e., in the present context "adjacent" mean touching or that an air gap 165, e.g., of up to 5 mm, may exist between each of the lenses 160 and an adjacent transmission medium 140 end 145. Alternatively, each lens 160 may be adjacent to an end 145 by being in contact with the respective transmission medium 140 end 145, i.e., without an air gap 165 between the lens 160 and the transmission medium 140 end 145. The lenses 160 may be formed of glass or plastic. As another example, when the apparatus 115 includes the fiber optic transmission medium 140, the lenses 160 and the fiber optic transmission medium 140 may be made as one piece, i.e., the transmission medium 140 ends 145 are shaped to focus the light beams entering to or exiting from the transmission medium 140, e.g., a curved surface.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A light waveguide apparatus, comprising:
   a light transmission body that is fittable under a door;
   a first lens mounted to a first end of the body;
   a second lens mounted to a second end of the body; and
   a transmission medium optically coupling the first and second lenses;
   wherein the body has a top surface and a bottom surface, each of the top and bottom surfaces extending between first and second ends of the body, each of the first and second ends extending between the top surface and the bottom surface, the top surface having a first length and the bottom surface having a second length such that respective angles between the bottom surface and the first and second ends are acute, the top surface having a predetermined length selected according to a width of the door.

2. The light waveguide apparatus of claim 1, wherein the transmission medium is at least one of a fiber optic material and a hollow tube transmission medium having an interior surface covered with a reflective material.

3. The light waveguide apparatus of claim 1, wherein the first and the second lenses are biconvex lenses.

4. The light waveguide apparatus of claim 1, further comprising a bracket mountable to a bottom surface of the door.

5. The light waveguide apparatus of claim 1, wherein an axis of the first lens and a first side of the door form an acute angle.

6. The light waveguide apparatus of claim 1, wherein an optical transmission range of the transmission medium includes an invisible light wavelength range.

7. The light waveguide apparatus of claim 1, further comprising an adhesive pad attached to a top surface of the light transmission body, whereby the adhesive pad is attachable to a bottom surface of the door.

8. The light waveguide apparatus of claim 1, wherein the light transmission body is holdably engageable with the door.

9. The light waveguide apparatus of claim 1, wherein the light transmission body is formed of an elastic material.

10. The light waveguide apparatus of claim 1, further comprising a cladding disposed between the transmission medium and the light transmission body.

11. The light waveguide apparatus of claim 10, wherein a first refractive index of the cladding is less than a second refractive index of the transmission medium.

12. The light waveguide apparatus of claim 1, wherein the first lens and the second lens are respectively attached to a first transmission medium end and a second transmission medium end of the transmission medium.

13. The light waveguide apparatus of claim 12, wherein there is an air gap between one or both of (a) the first lens and the first transmission medium end and (b) the second lens and the second transmission medium end.

14. The light waveguide apparatus of claim 1, wherein the light transmission body includes upwardly extending engagement portions at the transmission body ends.

15. A light waveguide apparatus, comprising:
    a light transmission body that is fittable under a door further including means for attaching the light transmission body to the door;
    a first lens mounted to a first end of the body;
    a second lens mounted to a second end of the body; and
    means for transmitting light beams bidirectionally between the first and the second ends of the light transmission body.

16. The light waveguide apparatus of claim 15, wherein the means for attaching the light transmission body to the door further includes means for clamping the light transmission body to side surfaces of the door.

17. The light waveguide apparatus 15, further comprising means for confining light in the transmitting means.

18. A light waveguide apparatus, comprising:
    a light transmission body that is fittable under, and holdably engageable with, a door;
    a first lens mounted to a first end of the body;
    a second lens mounted to a second end of the body; and
    a transmission medium optically coupling the first and second lenses.

19. The light waveguide apparatus of claim 18, wherein the light transmission body is formed of an elastic material.

20. The light waveguide apparatus of claim 18, further comprising one or both of an adhesive pad attached to a top surface of the light transmission body and a bracket mountable to a bottom surface of the door.

21. The light waveguide apparatus of claim 18, wherein the light transmission body includes upwardly extending engagement portions at the transmission body ends.

\* \* \* \* \*